434-414
SR
OR AI 242 6 H
DRAFTSMAN.
(1)
H. Beebe,
Mounting Slates
A.I. No. 242. A.I. Patented July 5, 1859.
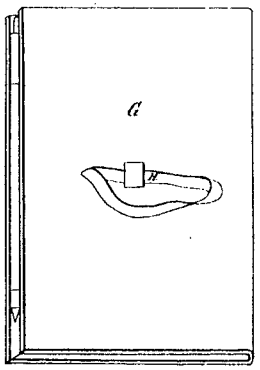
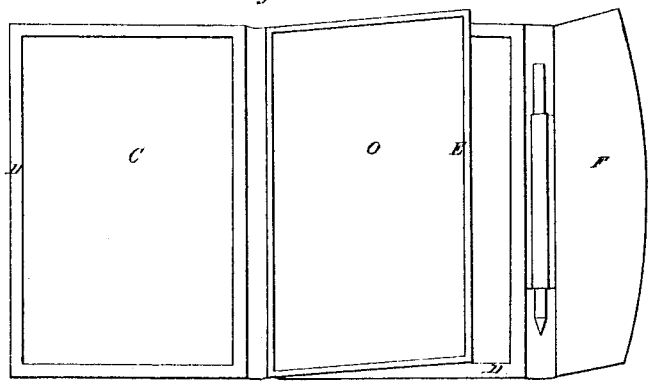
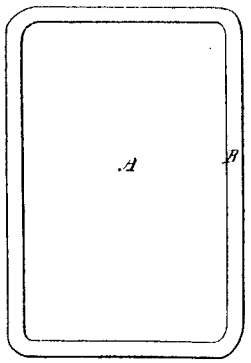
Witnesses.
J. S. Duncan
Chas. A. Foote
Inventor.
Hubbard Beebe
AM. PHOTO-LITHO. CO. N.Y. (OSBORNE'S PROCESS.)